P. TARGOSKY.
COMBINED SEEDING MACHINE AND MANURE SPREADER.
APPLICATION FILED OCT. 15, 1917.

1,282,139.

Patented Oct. 22, 1918.

Witnesses:
Emil W. Kry
Herbert C. Wood

Inventor.
Peter Targosky
by Lynch & Dover
his Attorneys.

UNITED STATES PATENT OFFICE.

PETER TARGOSKY, OF CLEVELAND, OHIO.

COMBINED SEEDING-MACHINE AND MANURE-SPREADER.

1,282,139.  Specification of Letters Patent.  Patented Oct. 22, 1918.

Application filed October 15, 1917. Serial No. 196,621.

*To all whom it may concern:*

Be it known that I, PETER TARGOSKY, a citizen of the United States of America, residing at Cleveland, in the county of Cuyahoga and State of Ohio, have invented certain new and useful Improvements in Combined Seeding-Machines and Manure-Spreaders; and I hereby declare the following to be a full, clear, and exact description of the invention, such as will enable others skilled in the art to which it pertains to make and use the same.

This invention relates to new and useful improvements in a combined seeding machine, drill and manure spreader.

The object of this invention is to provide a machine of the character indicated which will be simple in construction and positive in operation.

My invention therefore consists in certain novel features of construction and combination of parts hereinafter described in the specification, particularly pointed out in the claim and illustrated in the accompanying drawings.

Figure 2:
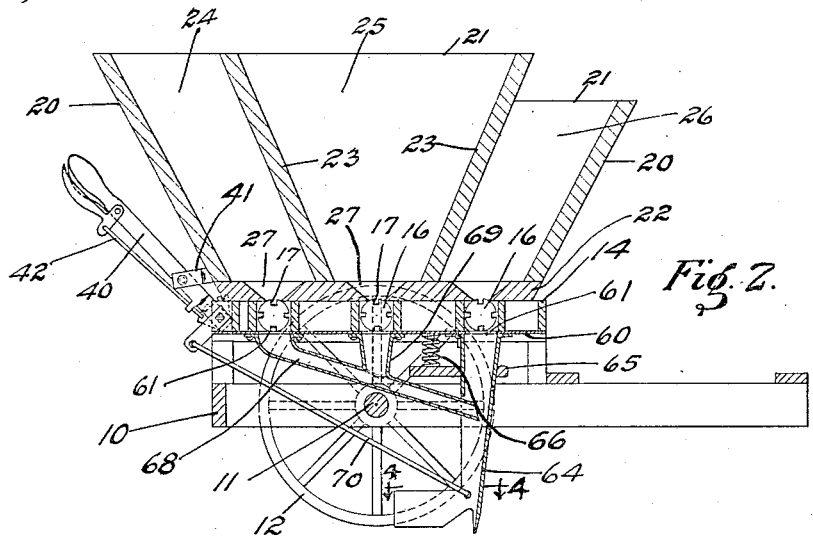
Figures 3, 4:
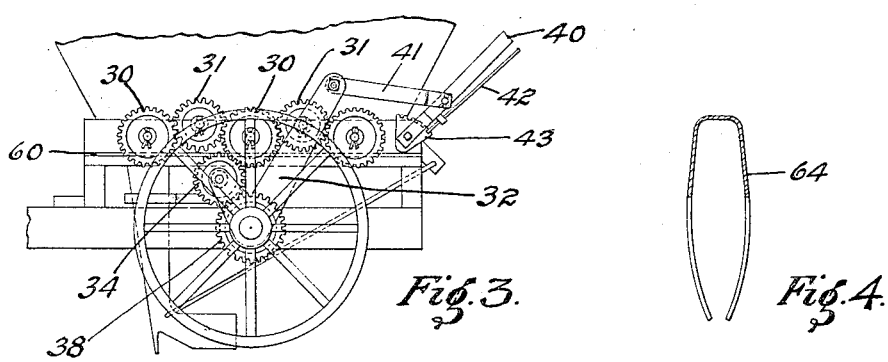
Figure 1:
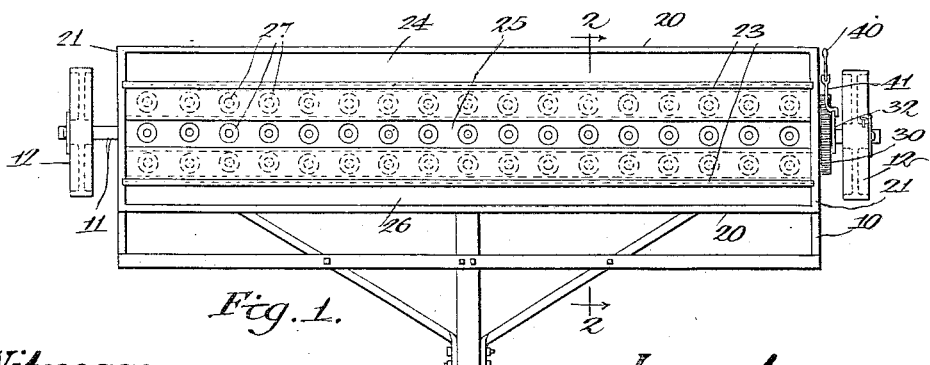

In the accompanying drawings, Figure 1 is a top plan of the machine embodying my invention. Fig. 2 is a sectional view on an enlarged scale showing the machine provided with drills. Fig. 3 is an end view of the machine as shown in Fig. 2. Fig. 4 is a section on line 4—4, Fig. 2.

The truck of the machine comprises an oblong rectangular frame 10 which is mounted on an axle 11 which is provided with traction wheels 12. On top of the truck is removably mounted a frame 14 which extends from end to end of the truck, and in this frame are mounted a series of rolls 16. These rolls 16 are provided in their outer surfaces with longitudinally extending seed receiving grooves 17. The body of the machine is mounted on top of the frame 14 so that it can be readily removed therefrom, and said body portion comprises side members 20, end members 21 and a bottom portion 22. The interior of the body portion is provided with longitudinally extending partitions 23 which divide the interior of the body into three compartments 24, 25 and 26. In the bottom of the body portion in each compartment is formed a series of openings 27 which are arranged just over the rolls 16. On the end of each of the rolls 16 at one end of the machine is secured a small gear wheel 30, and on the side of the frame 14 are mounted small gears 31 which intermesh with the gears 30. On the axle 11 is mounted a bell-crank lever 32, the smaller arm of which carries a gear wheel 34 which is arranged to be brought into or out of mesh with the center one of the gear wheels 30 by shifting the said bell-crank lever 32. On the axle 11 is rigidly mounted a gear wheel 38 which is always in mesh with the gear wheel 34 carried by the bell-crank lever. On the frame 14 is mounted a hand lever 40 which is connected with the bell-crank lever 32 by means of a link 41. The lever 40 carries a latch 42 which is arranged to engage with a toothed sector shaped plate 43. By moving the lever 40 back and forth, the gear wheel 34 can be thrown in or out of mesh with the central gear wheel 30, and thereby prevent the rotation of the seed feeding rolls when desired.

Now, when the machine is to be used for sowing seed in drills, the body of the machine and the frame 14 is lifted off the truck, and a plate 60, preferably of sheet iron, is set down on top of the truck and the frame 14 and the body of the machine are replaced in position. This plate 60 is provided with a series of openings 61 which correspond to the openings 27 in the bottom of the body portion. To the under side of the plate 60 below each opening 61 which corresponds to an opening 27 in the bottom of the compartment 26 is hinged a drill 64. All the drills are connected together by a long bar 65, and between the bar 65 and the plate 60 are coiled springs 66. The object of these springs is to yieldingly hold the drills in their operative position and hold the upper ends of the drills snugly against the under side of the plate 60. A flexible tube 68 extends from each opening 61 under the roller below the rear compartment to each drill. These flexible tubes are designed to carry the fertilizer from the rear compartment and drop it down in the furrow made by the drill. A small pipe 69 which is also made of some flexible material extends from each opening 61 under the central seed feeding roller and communicates with the flexible pipe 68. A link 70 extends from the hand lever 40 to the drill adjacent thereto so that by operating said handle all the drills can be swung up and out of contact with the ground when desired.

What I claim is:—

In a machine of the character described, a truck, a hopper body mounted on said truck, said hopper body being divided into three longitudinally extending compartments and each compartment having openings in the bottom thereof, a roller arranged below each compartment, said rollers having seed-receiving pockets which register with the openings in the bottom of the compartment, a hinged drill suspended below each opening in one of the compartments, resilient means for normally holding the drills against movement, flexible tubes connecting the openings in the other compartments with said drills, a hand lever mounted on the truck and means connecting the hand lever with the said drills whereby a movement of the hand lever will raise or lower said drills.

In testimony whereof, I sign the foregoing specification, in the presence of two witnesses.

PETER TARGOSKY.

Witnesses:
B. C. BROWN,
EMIL W. KRYZ.

Copies of this patent may be obtained for five cents each, by addressing the "Commissioner of Patents, Washington, D. C."